United States Patent
Kim et al.

(10) Patent No.: US 9,214,883 B2
(45) Date of Patent: Dec. 15, 2015

(54) SYSTEMS AND METHODS FOR UTILIZING AN ACTIVE COMPENSATOR TO AUGMENT A DIODE RECTIFIER

(71) Applicant: ABB Research Ltd., Zurich (CH)

(72) Inventors: Hongrae Kim, Cary, NC (US); Jouko Niiranen, Helsinki (FI); Jyoti Sastry, San Jose, CA (US)

(73) Assignee: ABB RESEARCH LTD., Zurich (CH)

( * ) Notice: Subject to any disclaimer, the term of this patent is extended or adjusted under 35 U.S.C. 154(b) by 0 days.

(21) Appl. No.: 14/025,534

(22) Filed: Sep. 12, 2013

(65) Prior Publication Data

US 2014/0152012 A1    Jun. 5, 2014

Related U.S. Application Data (60) Provisional application No. 61/733,197, filed on Dec. 4, 2012.

(51) Int. Cl.
*H02P 9/00* (2006.01)
*H02P 23/00* (2006.01)
*H02J 3/18* (2006.01)

(52) U.S. Cl.
CPC ............ *H02P 9/007* (2013.01); *H02P 23/0081* (2013.01); *H02J 3/1842* (2013.01); *Y02E 40/22* (2013.01)

(58) Field of Classification Search
USPC ......................................................... 290/44
See application file for complete search history.

(56) References Cited

U.S. PATENT DOCUMENTS

| | | | | |
|---|---|---|---|---|
| 5,526,252 | A * | 6/1996 | Erdman | 363/41 |
| 7,203,078 | B2 * | 4/2007 | Datta et al. | 363/37 |
| 7,312,537 | B1 * | 12/2007 | Walling | 290/44 |
| 8,044,527 | B2 * | 10/2011 | Mari et al. | 290/44 |
| 8,406,025 | B1 * | 3/2013 | Alexander | 363/132 |
| 2003/0007368 | A1 * | 1/2003 | Kawazoe et al. | 363/34 |
| 2005/0122083 | A1 * | 6/2005 | Erdman et al. | 322/20 |
| 2007/0186692 | A1 * | 8/2007 | Waszak et al. | 73/862.331 |
| 2011/0012364 | A1 * | 1/2011 | Abolhassani et al. | 290/55 |
| 2011/0310642 | A1 * | 12/2011 | Dai et al. | 363/37 |
| 2013/0181688 | A1 * | 7/2013 | Tupper et al. | 322/61 |

FOREIGN PATENT DOCUMENTS

| EP | 2741392 A2 | 6/2014 | | |
|---|---|---|---|---|
| JP | 09215396 A | * | 8/1997 | H02P 9/30 |

OTHER PUBLICATIONS

H. Kim et al., Active CompensatorAugmented Diode Bridge Rectifier Wind System, Jul. 6-9, 2011.*

(Continued)

*Primary Examiner* — Joseph Waks
(74) *Attorney, Agent, or Firm* — Jenkins, Wilson, Taylor & Hunt, P.A.

(57) ABSTRACT

The subject matter described herein includes an active compensatory augmented diode bridge rectifier system. According to one aspect, the system includes a generator unit configured to generate a current flow made up entirely of active current and a diode rectifier configured to receive the active current from the generator unit, to direct the active current to a connected power grid, and to receive a reactive current. The system further includes an active compensator configured to optimize the generator unit to produce the active current and to generate the reactive power used to facilitate the operation of the diode rectifier.

26 Claims, 7 Drawing Sheets

(56) References Cited

OTHER PUBLICATIONS

K. P. Sozanski, Control Circuit for Active Power Filter. Jan. 2011.*

Zhipeng Qiu et al., "Modeling and Control of Diode Rectifier Fed PMSG Based Wind Turbine," IEEE, pp. 1384-1388, (2011).

Seung-Ho Song et al., "Implementation and Control of Grid Connected AC-DC-AC Power Converter for Variable Speed Wind Energy Conversion System," IEEE APEC'03 vol. 1, pp. 154-158, (2003).

Luis A. Moran et al., "A Three-Phase Active Power Filter Operating with Fixed Switching Frequency for Reactive Power and Current Harmonic Compensation," IEEE Transactions on Industrial Electronics, vol. 42, No. 4, pp. 402-408, (Aug. 1995).

C. Schauder et al., "Development of a ±100 MVAr Static Condenser for Voltage Control of Transmission Systems," IEEE Transactions on Power Delivery, vol. 10, No. 3, pp. 1486-1496, (Jul. 1995).

E. Ganev, "High Reactance Permanent Magnet Machine for High Performance Power Generation Systems", SAE Transactions, vol. 115, Journal of Aerospace, Publication No. 2006-01-3076, (Nov. 2006).

Neal Clements et al. "Design Considerations for a Stator Side Voltage Regulated Permanent Magnet AC Generator," Energy Conversion Congress and Exposition, ECCE 2009. IEEE pp. 2763-2770, (Sep. 2009).

Katsumi Nishida et al., "Advanced Active Power Filter Controlled permanent-magnet synchronous generator for Automotive Applications," Power Electronics Specialists Conference, PESC 2007. IEEE, pp. 1508-1514, (Jun. 2007).

Malakondaiah Naidu et al., "A 4-kW 42-V Induction-Machine-Based Automotive Power Generation System with a Diode Bridge Rectifier and a PWM Inverter," IEEE Transactions on Industry Applications, vol. 39, No. 5, pp. 1287-1293, (Sep./Oct. 2003).

Z. Chen et al., "A modular, Permanent-Magnet Generator for Variable Speed Wind Turbines," Seventh International Conference on Electrical Machines and Drives, (Conf. Publ. No. 412), pp. 453-457, (Sep. 1995).

Taku Takaku et al., "Improved Wind Power Conversion System Using Magnetic Energy Recovery Switch (MERS)," Industry Applications Conference, Fortieth IAS Annual Meeting. Conference Record of the 2005, vol. 3, pp. 2007-2012, (Oct. 2005).

Vikram Kaura et al., "Operation of a Phase Locked Loop System Under Distorted Utility Conditions," IEEE Transactions on Industry Applications, vol. 33, No. 1, pp. 58-63, (Jan./Feb. 1997).

* cited by examiner

SYSTEMS AND METHODS FOR UTILIZING AN ACTIVE COMPENSATOR TO AUGMENT A DIODE RECTIFIER

PRIORITY CLAIM

This application claims the benefit of U.S. Provisional Patent Application Ser. No. 61/733,197, filed Dec. 4, 2012; the disclosure of which is incorporated herein by reference in its entirety.

TECHNICAL FIELD

The subject matter described herein relates to providing a reactive power source for electrical machine generators. More particularly, the subject matter described herein relates to systems and methods for utilizing an active compensator augmented diode rectifier.

BACKGROUND

Presently, 100% kilovolt-ampere (kVA) rated power converter wind solutions have increased in popularity despite the fact that the market has been dominated by doubly-led induction generators (DFIG) that utilize 40% kVA rated (approximately) power converters. Notably, 100% kVA rated power converter based wind system solutions are able to provide attractive features, such as improved low voltage ride through (LVRT) capability, better generator utilization, and a wider speed range. However, 100% kVA rated power converter wind solutions are more expensive, heavier, and larger than 40% kVA rated power converters. To overcome the aforementioned disadvantages, a diode bridge rectifier can be cascaded with a DC-to-DC converter. By utilizing a diode bridge rectifier solution, the overall system cost may be reduced. The use of diode bridge rectifier requires a source of reactive power, which is typically provided by the system's generator. Furthermore, a generator unit providing reactive power is not functioning or being controlled with optimized efficiency.

Accordingly, in light of these difficulties, there is need for a system and method for utilizing an active compensator to provide reactive power to a power generation system and to optimize the performance an associated generator unit.

SUMMARY

The subject matter described herein includes an active compensatory augmented diode rectifier system. According to one aspect, the system comprises a generator unit configured to generate a current flow comprised entirely of active current and a diode rectifier configured to receive the active current from the generator unit, to direct the active current to a connected power grid, and to receive a reactive current. The system further includes an active compensator configured to optimize the generator unit to produce the active current and to generate the reactive power used to facilitate the operation of the diode rectifier.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

The present subject matter includes a power generation system (e.g., a wind power generation system) that employs a full rating diode rectifier and a fractional rating active compensator that reduces the cost of the system and optimizes the performance of the system's generator unit. In one embodiment, the generator unit may be optimized by controlling the generator voltage via a control method that involves the active compensator injecting reactive power into the power generation system by adjusting the quadrature axis (q-axis) current and the direct axis (d-axis) current to optimal operating points in a synchronous reference frame. The q-axis is typically used to represent reactive (i.e., imaginary) power and current components while the d-axis is typically used to represent active (i.e., real) power and current components.

As used herein, the term "reactive power" and "reactive current" refers to the type of power flow and current flow utilized to facilitate the transfer of real power (i.e., active power) over an alternating current (AC) power generation and/or transmission system. In AC circuits, energy is stored temporarily in inductive and capacitive elements, which results in the periodic reversal of the direction of energy flow. The portion of power flow remaining, after being averaged over a complete AC waveform, is the real power or the energy that can be used perform work on a load (e.g., to overcome friction in a motor, heat an element, etc.). Conversely, the portion of power flow that is temporarily stored in the form of magnetic or electric fields, due to inductive and capacitive network elements is known as reactive power.

Figure 1:
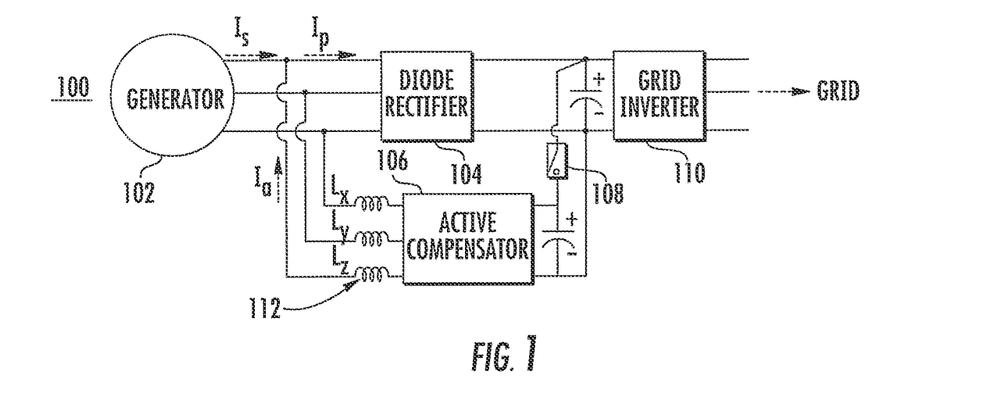
FIG. 1 is a diagram illustrating a diode bridge rectifier augmented by an active compensator according to an embodiment of the subject matter described herein.

FIG. 1 depicts an exemplary power generation system 100 that includes a generator unit 102, a diode rectifier 104, an active compensator 106, and a grid inverter 110. Although the present specification and FIG. 1 describes power generation system 100 as a wind power generator system, any machine system that may benefit from using an active compensator may be utilized without departing from the scope of the present subject matter. For example, any machine-based power generation application that operates at higher speed ranges (i.e., avoids high torque and low speed operation conditions) may benefit from the present subject matter. Alternative embodiments that may effectively utilize the present subject matter include a hydropower machine/system applications or an electrical generation system that utilizes a propeller shaft (e.g., in a ship) to produce electrical power.

In one embodiment, generator unit 102 may include any machine that is configured to generate electricity to be supplied to a power grid. For example, generator unit 102 may include a permanent magnet machine, such as a surface permanent magnet synchronous generator (SPMSG) unit. Depending on its configuration, generator unit 102 generates apparent power that comprises both an active (i.e., real) power component and a reactive power component. The active power component includes the power that performs work at the load, while the reactive power component is the power that is used to transfer energy/current among wires and circuit components (i.e., does no work at the load). A generator unit is typically sized to carry the total current associated with the apparent power (i.e., both the reactive current and the active current component).

Diode rectifier 104 may include a diode bridge rectifier circuit that directs active power to the power grid via a grid inverter 100. In one embodiment, diode rectifier 104 is designed to reduce the overall costs associated with system 100. System costs may be reduced because a diode bridge rectifier is less expensive to manufacture/implement than a full active insulated gate bipolar transistor (IGBT) based converter (or any other like device utilized to direct active power to the power grid). A diode rectifier may be advantageously used in the present subject matter since the diode rectifier has a much lower voltage drop than an IGBT converter while transmitting active power. Thus, there will be less energy loss (e.g., 20-30% less energy loss) in the system when a diode rectifier is utilized. However, in order to utilize a diode rectifier, a source of reactive power is required in system 200. By utilizing an alternative reactive power source (instead of obtaining reactive power from the generator unit), generator unit 102 may be reduced in frame size.

In one embodiment, diode rectifier 104 is dependent on a reactive current (or reactive power) in order to operate. Notably, diode rectifier 104 needs reactive power to function because the current traversing the diodes in the diode bridge requires reactive power to be transferred. Normally, both reactive power and active power are produced by generator unit 102. However, any reactive power or current generated by generator unit 102 is a product of the inefficiency of generator unit 102. In order to optimize the efficiency of generator 102, diode rectifier 104 may receive a reactive current generated by active compensator 106 (instead of generator unit 102). As used herein, the term optimized may refer to generator unit 102 being sized to only produce (e.g., substantially or entirely) an active current or active power (i.e., no reactive current or power) while the generator unit is experiencing an applied full load.

In one embodiment, active compensator 106 may include any circuit that is configured to supply reactive power to system 100. In one embodiment, active compensator 106 includes active circuit elements, such as a plurality of IGBT semiconductor devices, integrated gate commutated thyristor (IGCT) semiconductor devices, and/or other like power devices. For example, six (6) IGBTs may be linked together to form an active compensator circuit. By functioning as a source of reactive power for system 100, active compensator 106 is able to provide for both overall system cost reduction and generator operation optimization. In one embodiment, active compensator 106 is configured to compensate for reactive power and optimize the generator operation. For example, active compensator 106 may be configured to increase or decrease the voltage in generator unit 102. By providing a reactive current $I_a$ to system 100, a stator current $I_s$ produced by generator unit 102 does not include a reactive component. An exemplary process in which active compensator 106 provides a reactive current is detailed below. Active compensator 106 may provide reactive current $I_a$ to diode rectifier 104 via inductors 112.

In one embodiment, the reactive power generated by active compensator 106 is utilized for i) adjusting the voltage of generator unit 102 and ii) providing a source of energy utilized by diode rectifier 104. For example, the terminal voltage ($V_s$) of generator unit 102 may be boosted by active compensator 106 injecting reactive current into system 100. Notably, active compensator 106 may be used to optimize generator operation by adjusting voltage via changing active current $I_s$ originating from generator unit 102. Without active compensator 106, generator unit 102 must provide reactive power used for the operation of diode rectifier 104. Generator unit 102 may provide a stator current with a reactive power component that produces undesirable losses inside generator unit 102. However, generator unit 102 may be optimally configured to not generate a current with a reactive component if active compensator 106 is functioning, thereby reducing losses within generator unit 102. Consequently, the frame size of generator unit 102 may be reduced since the loss rating associated with the reactive power and/or current is eliminated.

In one embodiment, the voltage of generator unit 102 may be defined as the product of the magnetic flux produced by the magnet and the rotor speed of generator unit 102. The active component of the stator current $I_s$ is defined by the load and is therefore not suitable for controlling the voltage in generator unit 102. However, the reactive component of the stator current $I_s$ may be influenced by active compensator 106. Because the rectified direct current (DC) voltage in generator unit 102 cannot be varied to a large degree, active compensator 106 may be utilized to increase the generator voltage at low rotational speeds and decrease the generator voltage at high rotational speeds. The amount of the reactive current needed is dependent on the required maximum and minimum speeds of generator unit 102 and the inductance produced by generator unit 102. In one embodiment, the amount of reactive current may be derived by a processing unit in the system that utilizes a vector calculation, a mathematical formula, or the like, An exemplary control process utilizing a vector calculation is described below in FIG. 4.

If generator unit 102 is functioning within an intermediate rotational speed range, the voltage variation of generator unit 102 may be affected by rotational speed variations. Ultimately, generator unit 102 is adjusted such that it does not produce any reactive power. Consequently, active compensator 106 is configured to produce all of the reactive power or reactive current utilized by diode rectifier 104. In one embodiment, controlling the reactive current generated by active compensator 106 may be performed by either conducting an open loop control process or a closed loop control process. In an open loop control process, the reactive current for active compensator 106 may be determined using an analytical formula. For example, the reactive power consumed by a six pulse diode bridge rectifier may be represented as:

$$Q = \frac{2\mu_0 - \sin 2\mu_0}{1 - \cos \mu_0} \frac{3}{2\sqrt{2}\,\pi} U I_{DC}$$

where the commutation angle (in radians) may be represented as:

$$\mu_0 = \arccos\left(1 - \frac{2\sqrt{2}\,\pi f L'' I_{DC}}{U}\right)$$

where $I_{DC}$ is the DC current of the diode rectifier, f is the output frequency of the generator unit, L" is the subtransient inductance of the generator unit, and U is the rms phase-to-phase voltage of the generator unit.

In an alternate embodiment, the reactive current for active compensator 106 may also be determined using a simulation as a function of the rotor speed and active power (or active current) produced by generator unit 102. Alternatively, simplified or fitted formulas may be used instead of a simulation. In yet another embodiment, generator characteristics/values may be stored in a lookup table where a reference value is interpolated.

By utilizing a closed loop control process, the reactive current of generator unit 102 may be measured and the reactive current reference signal of active compensator 106 is adjusted by suitable controls, such as proportional and integral type controls (i.e., P-I controls). In such a case, the reactive current of generator unit 102 is set equal to the reference signal.

In one embodiment, active compensator 106 includes a generator terminal voltage controller that enters a "compensator mode" and starts to change the reactive current reference signal coming from either an open or closed loop control if the generator voltage tends to be too high or too low.

In one embodiment, active compensator 106 may function while generator unit 102 is operating at a low speed range, i.e., where the active power generated by generator unit 102 is sufficiently low for the compensator to handle while active compensator 106 is in a converter mode. While in converter mode, the DC bus of active compensator 106 is connected to the main DC bus of generation system 100. In this mode, generator unit 102 is run with its reactive current controlled to be zero (i.e., power factor cosine φ=1) or such that the overall losses in generator unit 102 are minimized.

Diode rectifier 104 receives a current $I_p$ comprising the combination of stator current $I_s$ from generator unit 102 and reactive current $I_a$ from active compensator 106. In response to receiving current $I_p$, diode rectifier 104 receives the necessary reactive power to function from the $I_a$ component and provides the active current provided via $I_s$ to grid inverter 110. Grid inverter 110 which subsequently provides the associated power to a connected power grid (i.e., "the grid").

Figure 2:
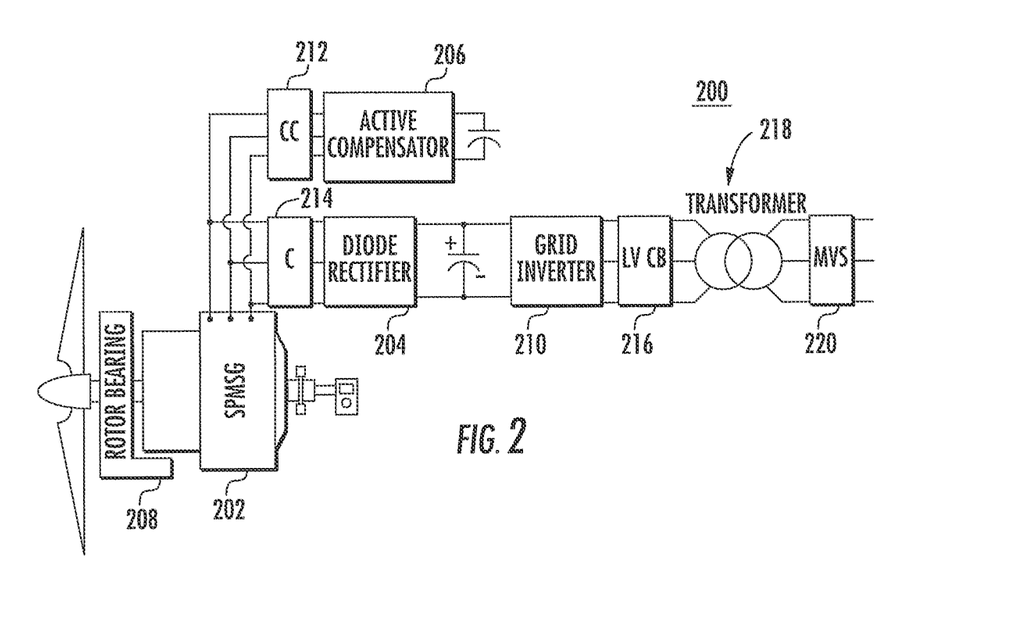
FIG. 2 is a diagram illustrating an exemplary active compensator augmented diode bridge rectifier wind power generator system according to an embodiment of the subject matter described herein.

FIG. 2 is a diagram illustrating an exemplary active compensator augmented diode bridge rectifier wind power generator system 200 according to an embodiment of the subject matter described herein. Notably, FIG. 2 depicts wind power generator system 200 as an exemplary embodiment of generator system 100 depicted in FIG. 1. System 200 includes a rotor and a rotor bearing 208 that interacts with SPMSG unit 202 (i.e., a wind power generator unit). Wind power generator system 200 also includes an active compensator 206 that provides reactive power to diode rectifier 204 and SPMSG 202 via a compensator contactor switch 212. Diode rectifier 204 may also utilize a contactor switch 214 to connect to active compensator 206 and SPMSG 202. Diode rectifier 204 may be further configured to receive and handle all of the active power generated by SPMSG 210 and to forward the active power to grid inverter 210. Grid inverter 210 can then provide the active power to transformer 218 (via LV CB switch 216). After being converted (i.e., stepped up/down), the power departs transformer 218 and enters the power grid via MV switchgear 220. Notably, wind power generation system 200 function in a similar manner described with respect to system 100 in FIG. 1.

Figure 3:
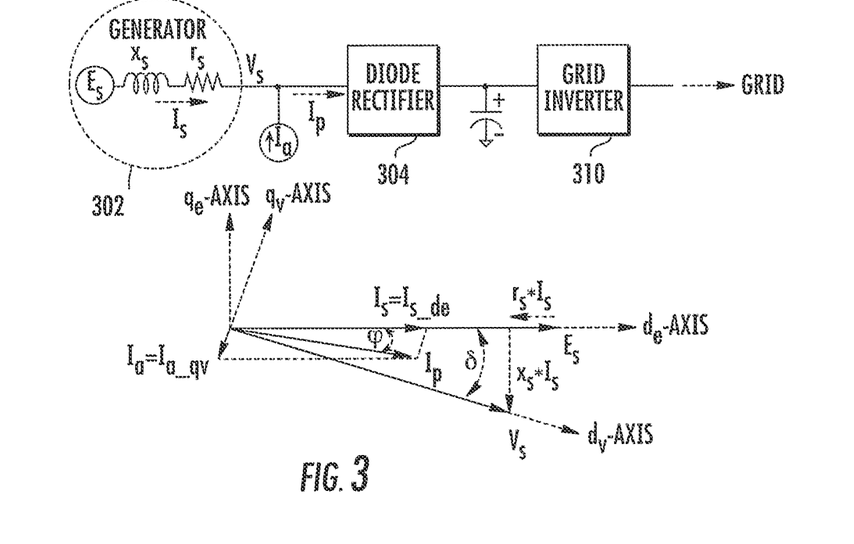
FIG. 3 is a vector diagram illustrating an optimized machine operation in a surface permanent magnet synchronous generator according to an embodiment of the subject matter described herein.

FIG. 3 is a vector diagram illustrating an optimized machine operation in a surface permanent magnet synchronous generator (SPMSG) and a corresponding block component diagram. Specifically, FIG. 3 depicts a vector diagram of a synchronous reference frame (e.g., direct-quadrature-zero transform) that may be used to simplify the analysis of a three-phase generation unit 302. In the case of balanced three-phase circuits, application of a synchronous reference frame reduces three AC quantities to two DC quantities. Simplified calculations can then be performed using the imaginary DC quantities before conducting an inverse transform to recover the actual three-phase AC results. FIG. 3 illustrates an optimized generator unit 302 that is configured to not generate any reactive power. Reactive power is instead provided to diode rectifier 304 via current $I_a$, which is generated by an active compensator (not shown in FIG. 3). Namely, the stator current, $I_s$, is adjusted to be aligned along the d-axis. Such an alignment indicates there is no q-axis component with respect to L. Thus, there is no reactive power component. Instead, the reactive power utilized by diode rectifier 304 is provided by the current $I_a$, which is produced by an active compensator and is depicted in FIG. 3 as being aligned with the $q_v$-axis, thereby representing an imaginary component (i.e., reactive power). FIG. 3 further depicts current $I_p$ (i.e., the current traversing the diode rectifier) as including a reactive power component that is completely derived from current $I_a$ and an active power component that is substantially or completely derived from $I_s$.

As indicated above, in addition to providing the necessary power to operate a diode rectifier, an active compensator may also control a generator unit in a power generation system to run under optimal conditions (e.g., MTPA or field oriented control) by injecting reactive power into the power generation system by adjusting the quadrature axis (q-axis) current and the direct axis (d-axis) current to optimal operating points in a synchronous reference frame. In one embodiment, the control of the system includes the alignment of a stator current, $I_s$, (i.e., the q-axis current) with the q-axis while regulating the capacitor voltage ($V_d$) of active compensator. Two separate sets of the d-q reference frames, which can rotate at a synchronous speed, may be used. The first d-q reference frame (i.e., $d_e$-axis and $q_e$-axis) in the control system is associated with a machine d-q reference, where the d-axis is aligned with the direction of the magnet. This reference frame may be used to determine where the stator current ($I_s$) is located with respect to the rotor position. By controlling the stator current angle $θ_1$ with respect to the reference frame to be zero, a maximum torque per ampere (MTPA) curve is followed. The second d-q reference frame (i.e., $d_v$-axis and $q_v$-axis) used in the control system may include a generator terminal voltage d-q reference frame. Notably, the d-axis in the reference frame is aligned in the same direction as the terminal voltage ($V_s$) vector. The reference frame may be used to determine the phase angle of the injected reactive current. As the injected current is set in quadrant with the terminal voltage, only reactive power is injected by the active compensator.

In one embodiment, an active compensator is utilized to adjust the generator current $I_s$ to optimal operating points. These optimal operating points may be determined by equations, simplified or fitted formulas, or lookup tables. Therefore, the active compensator can be sized to provide the total apparent power associated with the generator unit during full load. Because diodes are significantly cheaper than active switches like an insulated gate bipolar transistor (IGBT), the cost of a system may be substantially reduced by implementing an active compensator.

In one embodiment, a wind power generator system using a 2.2 MW SPMSG machine may be characterized with a 2700 kVA rating for an equipped full active rectifier. Conversely, an active compensator augmented diode bridge rectifier system may require an active compensator of 1500 kVA rating to produce the same 2.2 MW. Thus, the same power/current flow output is provided with a reduced generator size when an active compensator is used. Notably, the size of the active compensator implemented by the present subject matter may be smaller than a full active rectifier. To further reduce the size of the active compensator, fixed capacitors can be used to supply at least a portion of the reactive power required to be supplied to the system by the active compensator. Notably, better machine utilization may be achieved by capacitive-based reactive power In addition, slower flexible AC transmission system (FACTS) devices, such as a Static VAR compensator (SVC) and a thyristor controlled reactor (TCR), can be used in cooperation with an active compensator thereby allowing the active compensator to be sized for a fast transient to further reduce the overall cost of the system.

Figure 4:
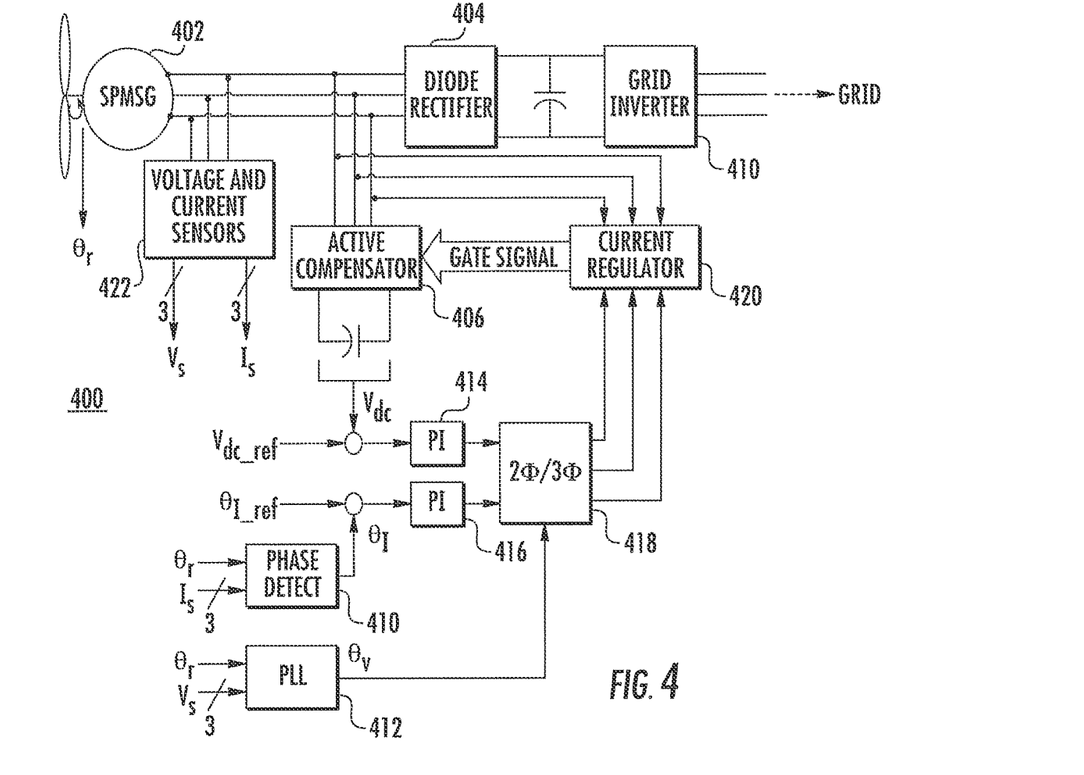
FIG. 4 is a block diagram illustrating an exemplary wind power generator control system according to an embodiment of the subject matter described herein.

FIG. 4 illustrates a control block diagram depicting a control system 400 that is utilized to optimize that operation of an SPMSG machine by adjusting the q-axis and d-axis currents to an optimal operating point. Although the control method depicted in FIG. 4 includes a P-I control embodiment, any type of control method may be employed without departing from the scope of the present subject matter. In one embodiment, SPMSG 402 produces a stator current ($I_a$) and terminal voltage ($V_s$) that is monitored/detected by a voltage and current sensors 422. Voltage and current sensors 422 may be configured to forward the voltage and current readings to a processing unit (not shown), which utilizes the readings with closed loop equations (i.e., that represent generator unit 402) in order to determine the amount of reactive power produced by generator unit 402. In addition, the processing unit may also receive a voltage measurement ($V_{dc}$) of the DC bus associated with active compensator 406 as an input. After processing the closed looped equations, the processing unit may utilize the measured $V_s$ and $I_s$ values as inputs to a phase detection module 410 and a phase lock loop (PLL) module 412 in system 400. In one embodiment, PLL module 412 may be used to track the phase of both current and voltage waveforms. Phase detection module 410 and PLL module 412 may also each receive the phase angle of the rotor ($\theta_r$) (e.g., the position of the rotor) from the processing unit as an input along with the terminal voltage $V_s$. PLL module 412 may compute a terminal voltage angle ($\theta_v$), which is forwarded to a two-phase/three-phase transform module 418.

Similarly, phase detection module 410 receives the $I_s$ and $\theta_r$ as input to determine the current angle ($\theta_1$) of the stator current. In order to regulate the reactive power, a predetermined/preset current angle reference signal ($\theta_{I\_ref}$) is compared to the derived E from phase detection module 410 and the difference (e.g., positive or negative difference) is provided to PI controller module 416. The output (e.g., a d-axis command) of the PI controller module 416 sets the d-axis current (i.e., the stator current) in the generator terminal d-q frame and is subsequently forwarded to a two-phase/three-phase transform module 418. In one embodiment transform module 418 may include a simple equation to transform a two phase signal to a three phase signal. Transform module 418 also receives the output (e.g., a q-axis command) of PI module 414, which compares the voltage ($V_{dc}$) of the DC bus of active compensator 406 with a reference value ($V_{dc\_ref}$). Notably, the floating DC bus voltage is regulated by adjusting the injected q-axis current (i.e., current L) in the generator terminal d-q frame. The DC bus voltage may increase as real power enters the system and decreases as real power leaves the active compensator. Therefore, the floating DC capacitor voltage may be effectively regulated.

The resulting three phase output signal from transform module 418 may then be forwarded to current regulator module 420. In one embodiment, the three phase output signal can include the phase reference current. Based on a feedback signal received from active compensator 406 (i.e., the actual measurement of the phase current of active compensator 406) and the current output signal from transform 418, current regulator 420 may perform a current regulation procedure that generates an on/off switching signal (e.g., gate signal). The signal may then be forwarded to active compensator 406 when activated.

In one embodiment, active compensator 406 utilizes the gate signal to control generator unit 402. For example, if a reactive current is detected in generator winding, system 400 utilizes an active compensator 406 to regulate the generator current to zero (0). Active compensator 406 may then inject reactive current into the connection point (e.g., link to diode rectifier 404) upon receiving the active gate signal from current regulator 420. Upon receiving the gate signal from current regulator 420, active compensator 406 is configured to inject a reactive current $I_s$ into system 400, which may be received by diode rectifier 404.

In one embodiment, the amount of reactive current required by system 400 is determined utilizing a closed loop equation(s) that represents/describes generator unit 402. Notably, active compensator 406 may monitor for a particular metric (e.g., a power related measurement) that is produced by generator unit 402 and utilizes the power related measurement to control the generator unit 402 to achieve optimal operation. For example, active compensator 406 may measure the stator current, the phase current, or the position of the generator rotor and provide the power related measurement(s) to a processing unit. Based on the power related measurements, the generator unit may be optimized, i.e., configured to produce a current flow (or power flow) that is made up substantially or entirely of active current (or active power), i.e., reduce the reactive component of the stator current to zero. The power related measurements may also be used as input for a closed loop calculation that determines the reactive power that is needed by diode rectifier 404 to transfer the active current (or power) generated by generator unit 402 to the grid inverter 410 and the power grid. After the amount of reactive current is determined, active compensator 406 may generate the requisite reactive current and inject the reactive current into a connection point that is linked to both generator unit 402 and diode rectifier 404.

Figure 5:
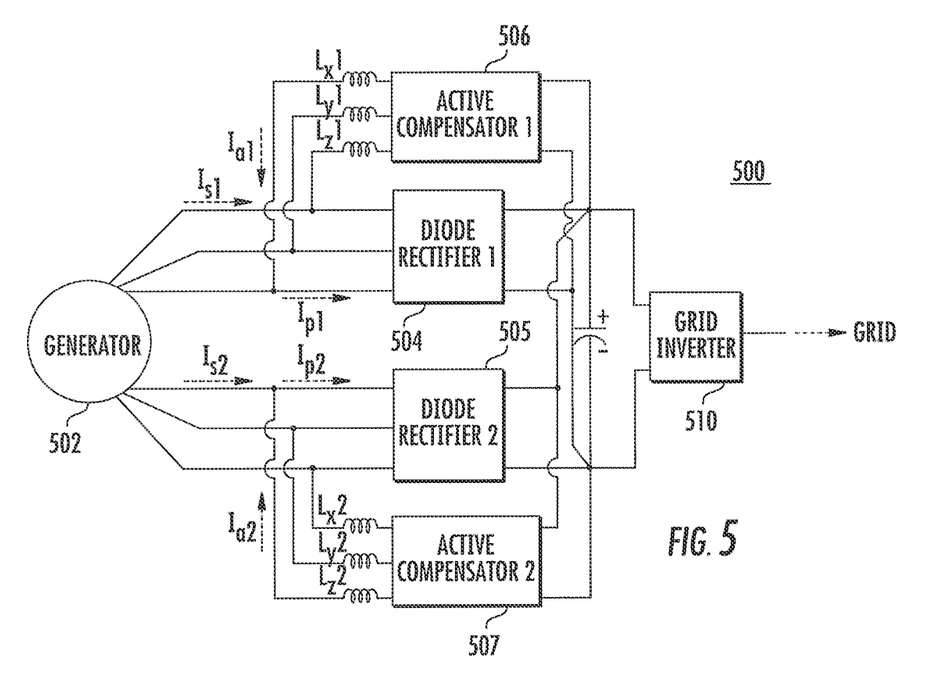
FIG. 5 is a diagram illustrating an exemplary use of an active compensator in a multi-phase wind power generator system according to an embodiment of the subject matter described herein.

In one embodiment, the present subject matter may be applied to multi-phase generators, such as a multi-phase wind power generator. By utilizing one or more active compensators in a multi-phase generator, harmonic losses within the generator may be reduced. FIG. 5 is a diagram illustrating an exemplary use of two active compensators 506-507 to compensate for the reactive power utilized by diode rectifiers 504-505 in a multi-phase (e.g., six-phase) wind power generator system 500. The output of diode rectifiers 504-505 augmented by active compensators 506-507 is provided to grid inverter 510 (which is ultimately directed to the power grid).

For speeds exceeding 95% of the maximum generator speed, wind power generator system 500 may exhibit increased harmonies due to diode rectifier operation that results in increased stator, rotor, and device conduction losses. Notably, a multi-phase wind power generator that utilizes an active compensator may provide harmonic cancellation in the airgap so that the rotor loss is reduced. By utilizing a plurality of active compensators 506-507 with a multi-phase wind power generator, such as a six-phase wind power generator 502 as depicted in FIG. 5, loss reduction may be achieved. Although FIG. 5 depicts a six-phase wind power generator, other multi-phase wind power generator systems may be implemented without departing from the scope of the present subject matter. For example, a nine-phase wind power generator system may be configured to utilize three active compensators and three diode rectifiers in order to reduce energy losses.

Figure 6:
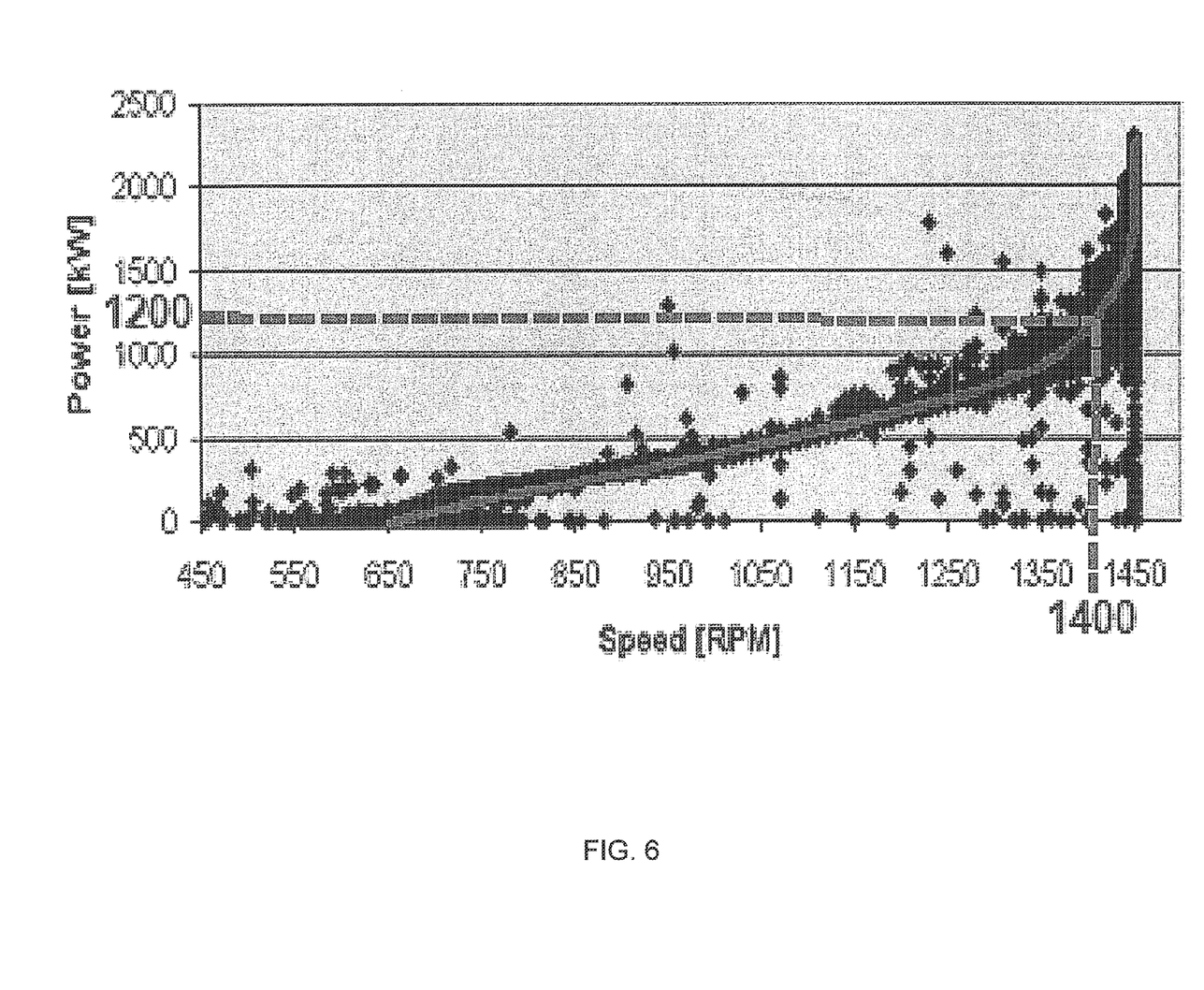
FIG. 6 is a plot graph depicting the association of power and speed performance characteristics of an exemplary wind power generator system according to an embodiment of the subject matter described herein.

FIG. 6 depicts a plot diagram that illustrates performance characteristics of a wind power generator system. In particular, FIG. 6 illustrates the performance characteristics of an exemplary 2.2 MW wind power generator. For example, the plot points in the diagram indicate the relationship between generator power (kW) and generator speed (RPM) associated with a 2.2 MW wind power generator. Notably, 0-55% of the rated power is generated at speeds below (approximately) 95% of the maximum generator speed. Likewise, 55% of the rated power is generated at speeds above (approximately) 95% of the maximum generator speed. FIG. 6 further illustrates a data curve that may be derived from data points which indicate that the exemplary wind power generator generates 1200 kW (approximately 55% of rated power) at a speed of 1400 RPM (approximately 95% of maximum speed) while utilizing an active compensator to augment a diode rectifier system. Based on this performance characteristic of the wind power generator, the operation and the size of the active compensator can be determined.

For speeds below 95% of the maximum generator speed, the active compensator functions as a generator active rectifier. Therefore, the current flow (or associated power flow) traverses through the active compensator. Using FIG. 1 as an example, the current flow from generator 102 would flow directly to active compensator 106 (i.e., thereby bypassing diode rectifier 104) and be directed to gird inverter 110 via a closed switch 108. For speeds in excess of 95% of the maximum generator speed, active compensator 106 may function as a compensator. For example, the current flow from generator 102 would flow directly to diode rectifier 104 (i.e., thereby bypassing active compensator 106) and be directly provided to gird inverter 110 (i.e., switch 108 would be open). Thus, the current traverses through the diode rectifier in this configuration. Generally speaking, 50-60% of the rated kVA is an appropriate kVA rating for an active compensator to reduce the overall system cost and to optimize the generator operation.

Figure 7:
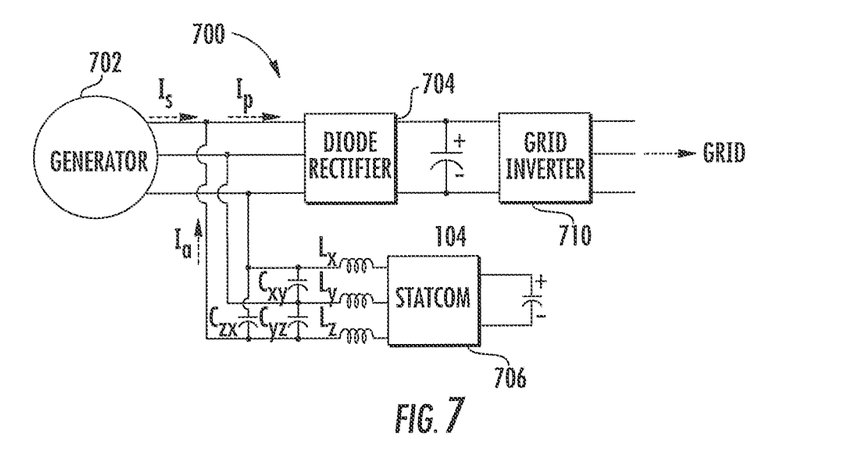
FIG. 7 is a diagram illustrating an exemplary use of a static synchronous compensator (STATCOM) device in a wind power generator system according to an embodiment of the subject matter described herein.

In one embodiment, the active compensator utilized in the present subject matter may include a static synchronous compensator (STATCOM) device. FIG. 7 depicts a power generation system 700 that includes a series compensating STATCOM device 706 as a reactive power source that is used to regulate the terminal voltage of generator unit 702. For example, the DC voltage at a DC bus of the STATCOM device may be independently controlled by varying the imaginary and real part of the current at the machine terminal. Specifically, the STATCOM DC bus may be disconnected from the main DC bus. In the previously mentioned embodiments, the active compensator is configured to send power to the DC bus by using a switching bus. However, in the particular embodiment depicted in FIG. 7, there is no switching mechanism on the DC bus side of system 700. In one embodiment, the connection existing between STATCOM device 706 and the remaining system 700 may include at least one inductor and/or at least one capacitor.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for utilizing an active compensator to augment a diode rectifier, the system comprising:
   a generator unit configured to generate a current flow substantially comprised of active current;
   the diode rectifier configured to receive the active current from the generator unit, to direct the active current to a connected power grid, and to receive a reactive current; and
   the active compensator configured to optimize the generator unit to produce the active current and to generate the reactive current used to facilitate the operation of the diode rectifier, wherein the active compensator is configured to optimize the generator unit by adjusting a direct axis (d-axis) current included in a synchronous reference frame to an optimal operating point, wherein the synchronous reference frame represents the generator unit.

2. The system of claim 1 wherein the current flow generated by the generator unit includes zero reactive current.

3. The system of claim 1 wherein the generator unit includes a wind power generator unit.

4. The system of claim 1 wherein the generator unit includes a surface permanent magnet synchronous generator (SPMSG) unit.

5. The system of claim 1 wherein the generator unit includes a frame structure that is sized to accommodate the generation of the active current while the generator unit is experiencing an applied full load.

6. The system of claim 1 wherein the d-axis is adjusted to the optimal operating point by adjusting a stator current produced by the generator unit to be aligned along the d-axis.

7. The system of claim 1 wherein the optimal operating point includes a point on a maximum torque per ampere (MTPA) curve.

8. The system of claim 7 wherein the active compensator includes at least six IGBT circuits.

9. The system of claim 1 wherein the active compensator includes either a plurality of insulated gate bipolar transistor (IGBT) semiconductor devices or a plurality of integrated gate commutated thyristors (IGCT) semiconductor devices.

10. The system of claim 1 wherein the diode rectifier includes a diode bridge rectifier.

11. The system of claim 1 wherein a processing unit associated with the active compensator is configured to determine an amount of the reactive current by utilizing a vector calculation or a mathematical formula.

12. The system of claim 1 wherein the active compensator includes a STATCOM device.

13. A method for utilizing an active compensator to augment a diode rectifier, the method comprising:
   receiving, at an active compensator, a power related measurement from a generator unit;
   configuring the generator unit, based on the power related measurement, to produce a current flow substantially comprised of active current;
   determining an amount of reactive power that enables a diode rectifier to transfer the active current to a power grid;

generating the determined amount of reactive power at the active compensator; and providing the determined amount of reactive power to the diode rectifier.

14. The method of claim 13 wherein the current flow generated by the generator unit includes zero reactive current.

15. The method of claim 13 wherein the generator unit includes a wind power generator unit.

16. The method of claim 13 wherein the generator unit includes a surface permanent magnet synchronous generator (SPMSG) unit.

17. The method of claim 13 wherein the generator unit includes a frame structure that is sized to accommodate the generation of the active current while the generator unit is experiencing an applied full load.

18. The method of claim 13 wherein configuring the generation unit includes adjusting a direct axis (d-axis) current included in a synchronous reference frame to an optimal operating point, wherein the synchronous reference frame represents the generator unit.

19. The method of claim 18 wherein adjusting the d-axis to the optimal operating point includes adjusting a stator current produced by the generator unit to be aligned along the d-axis.

20. The method of claim 18 wherein the optimal operating point includes a point on a maximum torque per ampere (MTPA) curve.

21. The method of claim 13 wherein the active compensator includes either a plurality of insulated gate bipolar transistor (IGBT) semiconductor devices or a plurality of integrated gate commutated thyristors (IGCT) semiconductor devices.

22. The method of claim 21 wherein the active compensator includes at least six IGBT semiconductor devices.

23. The method of claim 13 wherein the diode rectifier includes a diode bridge rectifier.

24. The method of claim 13 wherein determining the amount of the reactive current includes utilizing a vector calculation or a mathematical formula.

25. The method of claim 13 wherein the active compensator includes a STATCOM device.

26. A system for utilizing an active compensator to augment a diode rectifier, the system comprising:

a generator unit configured to produce a power related metric;

a diode rectifier configured to receive an active current from the generator unit and to direct the active current to a connected power grid; and an active compensator configured to measure the power related metric to generate a power related measurement, to configure the generator unit to produce a current flow substantially comprised of the active current based on the power related measurement, to receive a signal indicating a determined amount of reactive current that enables the diode rectifier to transfer the active current to the power grid, to generate the determined amount of reactive current, and to provide the determined amount of reactive current to the diode rectifier.

* * * * *